United States Patent [19]

Gente

[11] Patent Number: 4,939,337

[45] Date of Patent: Jul. 3, 1990

[54] APPARATUS FOR THE STORAGE AND HANDLING OF AT LEAST ONE ELONGATE FLEXIBLE ELEMENT, SUCH AS A FEEDER AND SIGNAL TRANSMISSION CABLE, FOR AN AUTOMATIC ORBITAL WELDING MACHINE

[75] Inventor: Daniel Gente, Villeurbanne, France

[73] Assignee: Framatome, Courbevoie, France

[21] Appl. No.: 240,313

[22] Filed: Sep. 6, 1988

[30] Foreign Application Priority Data

Sep. 4, 1987 [FR] France .................................. 87 12322

[51] Int. Cl.$^5$ ................................................ B23K 9/00
[52] U.S. Cl. .............................. 219/125.11; 219/137.9
[58] Field of Search ............. 219/60 A, 125.1, 125.11, 219/137.9

[56] References Cited

U.S. PATENT DOCUMENTS

| 3,088,018 | 4/1963 | Ross et al. | 219/60 A |
| 3,207,881 | 9/1965 | Pagan | 219/60 A |
| 3,678,239 | 7/1972 | Hill | 219/60 A |
| 3,743,812 | 7/1973 | Peyrot | 219/60 A |
| 3,990,551 | 11/1976 | Jamison et al. | 191/12 R |
| 4,199,673 | 4/1980 | Thiebaut et al. | 219/60 A |

FOREIGN PATENT DOCUMENTS

1296489  5/1969  Fed. Rep. of Germany .
8525737 12/1985  Fed. Rep. of Germany .

Primary Examiner—Clifford C. Shaw
Attorney, Agent, or Firm—Pollock, Vande Sande & Priddy

[57] ABSTRACT

The apparatus comprises a storage container (11) for the elongate flexible element (97), guide pulleys (12, 13, 14) and an assembly (15) movable in either direction around the components to be welded (2). One of the guide means (12, 13, 14) is motorized. The annular assembly (15) comprises carriages (43) moving on the rail of the welding head (6) and connected to a master carriage whose movements are subject to the movements of the welding head (6), and an annular trough which receives the flexible element (97) and which is fastened to the movable annular assembly (15).

7 Claims, 5 Drawing Sheets

APPARATUS FOR THE STORAGE AND HANDLING OF AT LEAST ONE ELONGATE FLEXIBLE ELEMENT, SUCH AS A FEEDER AND SIGNAL TRANSMISSION CABLE, FOR AN AUTOMATIC ORBITAL WELDING MACHINE

FIELD OF THE INVENTION

The invention relates to an apparatus for the storage and handling of an elongate flexible element, such as a feeder and signal transmission cable, for a machine for the orbital welding of rotationally symmetrical components of large size.

BACKGROUND OF THE INVENTION

Automatic welding machines which are used for the orbital welding of large-size components of rotational symmetry, such as pipes, are known in the art.

To prolong the lifetime of pressurized-water nuclear reactors, it has been proposed to carry out the complete change of the steam generators which, during operation, experience wear attributable to corrosion caused by the primary water and by the feed water. The steam generators are connected to the primary pipelines in the region of their water boxes, and, after a new replacement generator has been installed, it is necessary to carry out the butt welding of the primary pipelines and the connection pieces of the water box. These operations are carried out on the primary circuit of a nuclear reactor which has already been in operation, and therefore in a highly radioactive environment. An automatic remote-controlled welding machine consequently must be used in order to carry out the connecting welding of the replacement steam generator. A remote-controlled orbital TIG welding machine is generally used for this operation, the entire welding operation being computer-assisted. The control station is usually at a great distance from the zone where welding is carried out, and various connections between the welding machine and the control station are required, for example in order to control, regulate and display the welding operation.

The orbital welding machine comprises a head moving on a rail arranged round the pipe and the connection piece to be joined by welding. The welding head must to be connected to the control station by means of an assembly of feeder and signal transmission cables, making it possible to supply the electrical current necessary for carrying out welding, setting the various welding parameters and controlling the movements of the electrode. The feeder and signal transmission cables are bulky and heavy and must follow the orbital movement of the welding head, without thereby causing disruptions to the welding in progress. The cables are therefore usually installed in two flexible large-diameter tubes called umbilicals, so that it is possible to carry out the guidance and combined handling of the various cables connected to the welding head.

To date, there has been no known apparatus making it possible to carry out in the most efficient possible way the guidance, storage and handling of the cables connected to the welding head.

SUMMARY OF THE INVENTION

The object of the invention is, therefore, to provide an apparatus for the storage and handling of at least one elongate flexible element, such as a feeder and signal transmission cable, for a machine for the orbital welding of rotationally symmetrical components of large size, controlled remotely from a control station and comprising a motorized welding head which is mounted movably on a running rail arranged round the components to be welded and to which one end of the elongate flexible element is connected, the apparatus making it possible to ensure the feeding and control of the welding head without disrupting the orbital welding operation.

To this end, the apparatus according to the invention comprises:
- a storage container for the flexible element, connected to the control station by means of at least one junction cable and comprising at least one compartment for a reserve length of the flexible element, of which a stationary end opposite the end connected to the welding head is fixed to the junction cable,
- means for the guidance and handling of the flexible element, which are arranged between the outlet of the storage container and the welding machine and which consist of pulleys, at least one of these pulleys arranged at the outlet of the storage container being motorized and having a regulated speed, and
- an assembly mounted so as to be movable in either direction around the components to be welded and comprising:
- a motorized master carriage mounted movably on the rail of the welding head and subject to the movements of the welding head,
- a plurality of carriages connected to the master carriage and forming, with the welding head and the master carriage, an assembly of annular shape movable on the rail of the welding head, and
- an annular trough which is intended for receiving the flexible element and which is fastened to the articulated annular assembly.

BRIEF DESCRIPTION OF THE DRAWINGS

To make it easier to understand the invention, an embodiment of an apparatus for the storage and handling of the feeder and signal transmission umbilicals of an orbital welding machine used in a change of steam generator will now be described with reference to the accompanying figures.

DESCRIPTION OF PREFERRED EMBODIMENT

Figure 1:
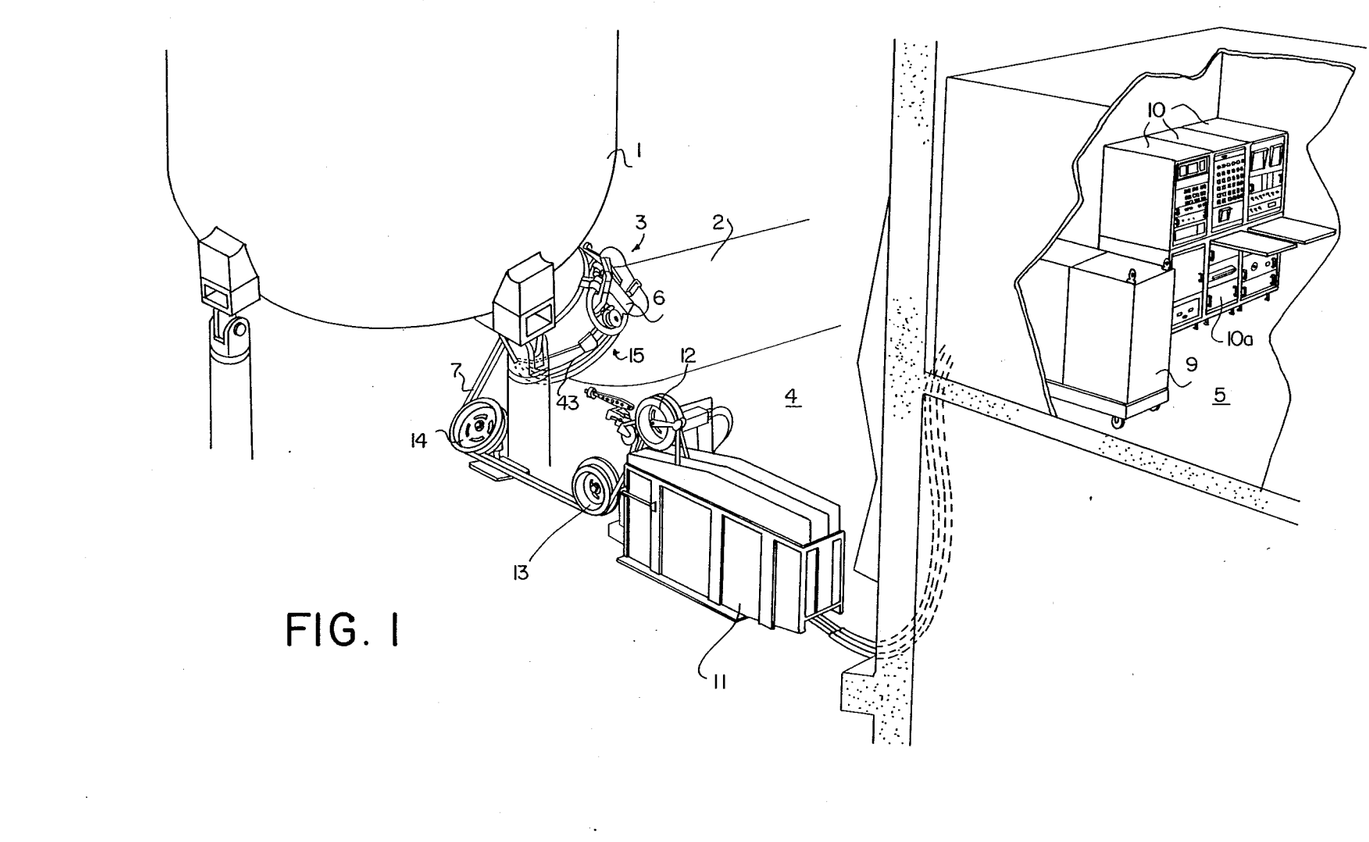
FIG. 1 is a perspective view of the apparatus as a whole, the welding machine and its control elements.

FIG. 1 shows a part 1 of the water box of a steam generator of a pressurized-water nuclear reactor, while it is being connected to a pipe 2 of the primary circuit. The connection is made by welding, using an orbital TIG welding machine 3 in the operating position in the junction zone between the pipeline 2 and a corresponding connection piece integral with the water box 1. The welding machine 3 is put to work inside the cave 4 in which the steam generator is installed, within the safety containment of the reactor. The welding operation is carried out from a control station 5 distant from the cave 4. The welding head 6 of the machine 3 is fed and controlled by means of cables arranged inside two flexible tubes 7, called umbilicals.

One of the ends of the umbilicals 7 is fastened to the welding head and follows the latter in its movements round the junction zone between the pipeline 2 and the corresponding connection piece of the water box 1.

The cables arranged within the flexible tubes must to be connected to cabinets 9 and 10 located inside the control station 5, in order to ensure that the welding machine 3 is fed with electrical current and controlled.

The storage and handling apparatus according to the invention comprises a storage container 11, guide and/or handling pulleys 12, 13 and 14 for the umbilicals 7, and an annular assembly 15 arranged round the zone to be welded and mounted movably on the supporting and guide rail 16 of the welding head 6.

Figure 5:
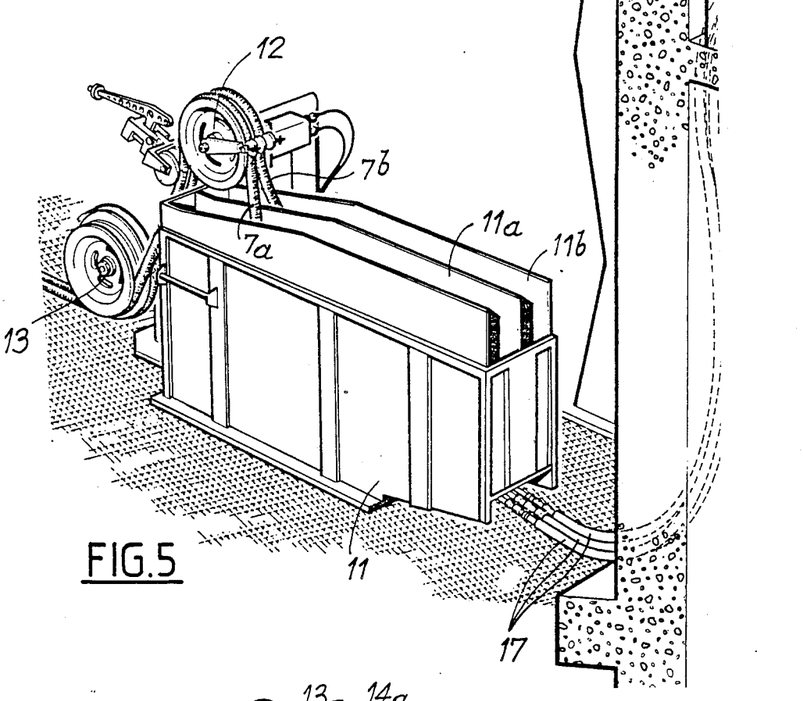
FIG. 5 is a view of the storage container of the apparatus according to the invention.

FIGS. 1 and 5 show the storage container 11 consisting of a structure, in which two compartments 11a and 11b of elongate shape and of small width are delimited. Each of the compartments 11a and 11b has a width only very slightly larger than the diameter of the umbilicals 7a and 7b, a reserve length of which is stored in the compartment 11a and in the compartment 11b respectively. For storing them, the flexible umbilicals 7a and 7b are arranged over the entire length of the storage container 11 and form successive folds stacked on top of one another. The umbilicals 7a and 7b each have a stationary end located in the lower part and at the rear of the storage container 11. At these stationery ends, the cables arranged within the umbilicals 7a and 7b are connected to-junction cables 17, themselves connected at their other end to the cabinets 9 and 10 inside the control station 5.

At the outlet of the storage container 11, the umbilicals 7a and 7b are taken up by the motorized pulleys 12, then by the deflecting pulleys 13 and 14, and finally by the rotary annular assembly 15 movable round the welding zone. This apparatus for handling the umbilicals has been shown in FIG. 2. Each of the assemblies 12, 13 and 14 comprises two pulleys 12a–12b, 13a–13b, 14a–14b, one of the pulleys of each assembly being intended for the umbilical 7a and the other pulley for the umbilical 7b. The assembly 12 consists of two pulleys of the same diameter 12a, 12b fastened on one and the same axle connected to the output shaft of a drive motor 19. The storage container 11 contains a reserve length of the umbilicals 7. The rotation of the motor 19 in one direction makes it possible to extract the umbilicals from the container 11, while the rotation in the other direction makes it possible to re-establish the reserve in the container 11.

Figure 2:
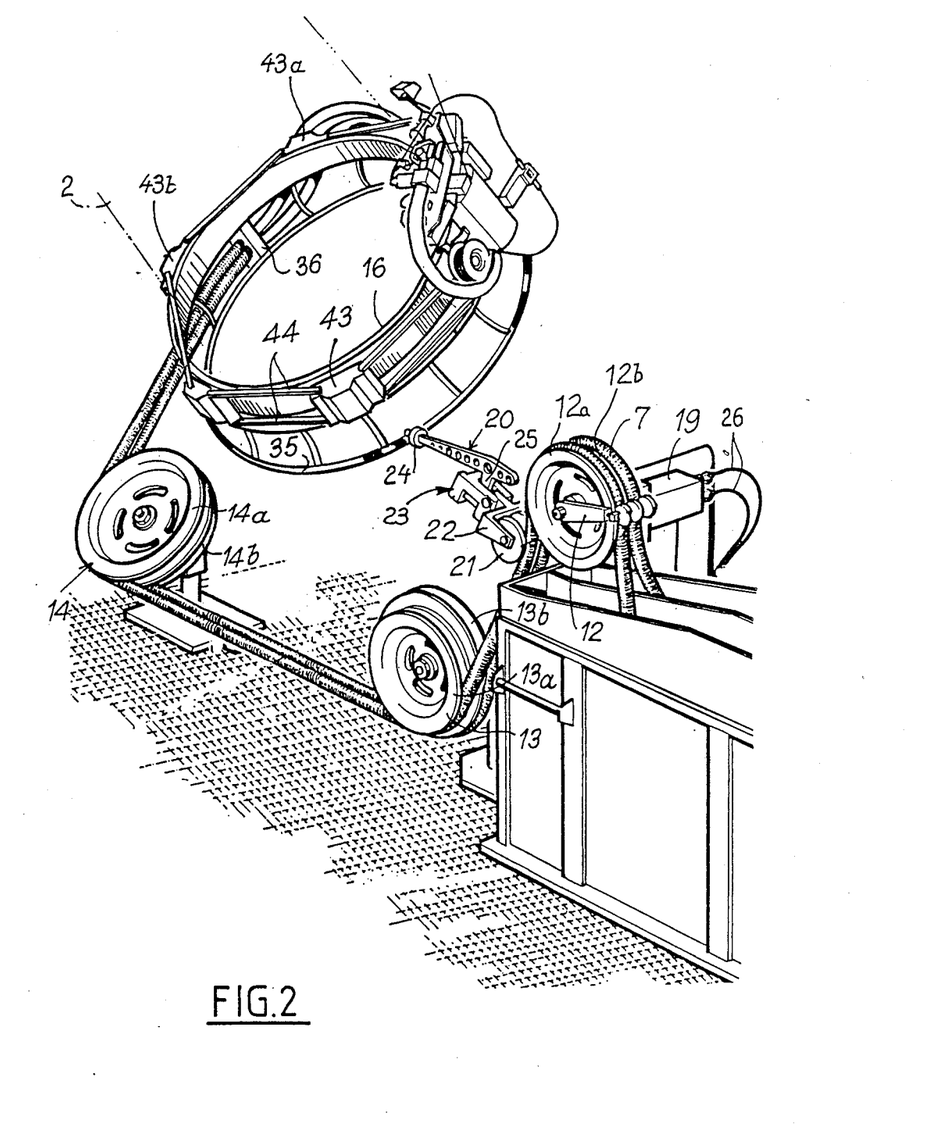
FIG. 2 is a general perspective view of the handling apparatus according to the invention.

A regulating device 20 is associated with a motor 19 and makes it possible to adjust the speed of this motor according to the requirements of the umbilical-handling apparatus.

The device 20 functions as a tensimeter and comprises two pulleys 21, each in contact with one of the umbilicals. The pulleys 21 are mounted rotatably on a slide 22 mounted slidably in a support 23 fixed to a horizontal arm mounted on the structure of the container 11. The pulleys 21 are kept in contact with the umbilicals 7 by means of a counterweight 24 located at the end of a lever 25 articulated on the support 23 and bearing on the slide 22. An angle sensor (not shown) is likewise mounted on the support 23 and is connected by means of conductors 26 to a circuit for adjusting the speed of the motor 19.

In fact, the linear movement of the slide 22, which is transmitted to the wheel of the sensor by means of a rack, depends on the tension of the umbilicals 7 at the outlet of the drive assembly 12 consisting of the motorized pulleys 12a and 12b.

If the tension of the umbilicals 7 is low, the linear movement of the slide 22 takes place from the top downwards. The sensor transmits a signal determining a slowing of the motor 19 or, depending on the amplitude of the signal, commands the reversal of the direction of rotation in order to wind up the umbilicals.

On the contrary, if the tension of the umbilicals 7 is high, the linear movement of the slide 22 takes place from the bottom upwards, and the sensor then transmits a signal making it possible to increase the speed of the pulleys of the assembly 12, and therefore the outlet speed of the length reserve of the umbilicals which is contained in the container 11.

The pulley assemblies 13 and 14 are assemblies for deflecting the umbilicals 7 and each comprise two pulleys mounted loosely on an inclined axle. The two pulleys are of different diameters, to make it easier for the umbilicals to pass along and to ensure that the umbilicals continue to have the same extended length when there is an angular deflection towards the storage container 11; length compensation is carried out on the two successive assemblies 13 and 14.

Figure 6:
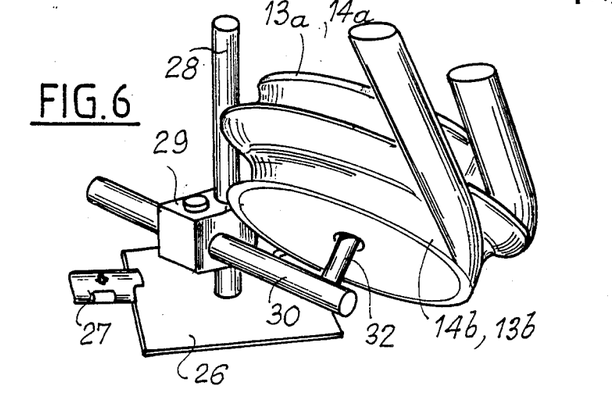
FIG. 6 is a perspective view on a larger scale of a guide pulley of the apparatus according to the invention.

The general structure of the assemblies 13 and 14 is identical, this arrangement being shown in FIG. 6. Each of the assemblies 13 and 14 comprises a flat support 26 fastened to the floor of the cave 4 by means of straps 27. The support 26 carries a vertical axle 28, on which is mounted slidably a parallelepipedic supporting block 29, in which a horizontal axle 30 slides. The axle 30, at its end, carries a shaft 32 on which the pulleys 13a and 13b, or 14s and 14b, are mounted loosely.

Figure 3:
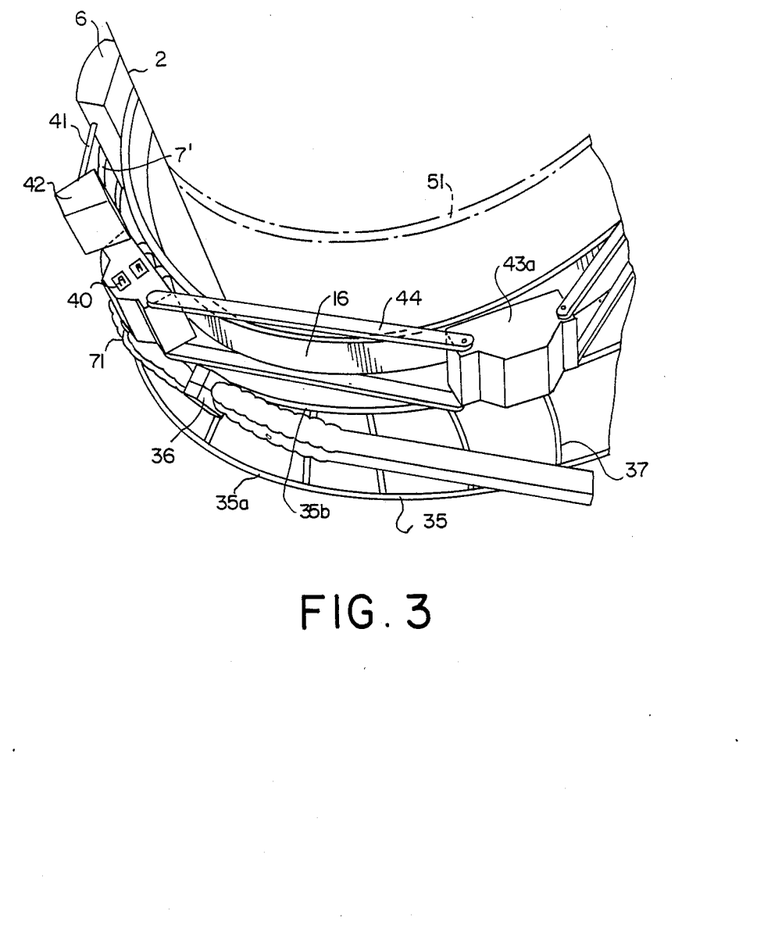
FIG. 3 is a partial perspective view of the assembly, mounted movement around the components to be welded, of the handling apparatus according to the invention illustrated in FIG. 2.

As can be seen in FIGS. 2 and 3, the annular assembly 15, mounted so as to be movable in rotation round the junction zone in which welding is carried out, has a receiving and supporting trough 35 for the umbilicals 7 which are fastened to this trough 35 by means of a fastening bracket 36. The umbilicals 7 have an end portion located between the fastening bracket 36 and the welding head 6 and forming a loop capable of absorbing variations between the welding head and the movable assembly, thus allowing freedom of the welding head, without mechanical stress, in relation to the motorized carriage during their rotary movements on the rail 16 of the welding machine.

The trough 35 takes the form of a light-weight structure consisting of stainless-steel tubes and comprising two hoops 35a and 35b connected to one another by means of curved tube portions 37 forming an annular cradle for receiving and winding the umbilicals 7. Each hoop 35a and 35b consists of two half-hoops with a toggle-fastening system for joining them together.

The device 15 also includes an articulated assembly of substantially annular shape, consisting of carriages movable on the rail 16 of the welding head 6 and connected to one another by means of articulated bars. This assembly comprises a motorized carriage 40 subject to the movements of the welding head 6 by means of a connecting rod 41 and an angle sensor 42. The articulated annular assembly is completed by four non-motorized carriages 43, of which a first carriage 43a is connected to the motorized carriage 40, then another or second carriage 43b to the first, and so on up to the last carriage. The carriages 43 are arranged at a uniform distance from one another over the circumference of the rail 16, on which they move, and are connected to one another and to the motorized carriage 40 by means of sets of two articulated bars 44 arranged on either side of the rail 16.

The articulated annular assembly is thus produced in catenary form, and this allows it to adapt to the shape of the rail 16. The trough 35 is fastened to each of the five carriages 40 and 43 forming the articulated assembly. This assembly can be mounted in a simple way, these various elements having removable connection means.

Figure 4:
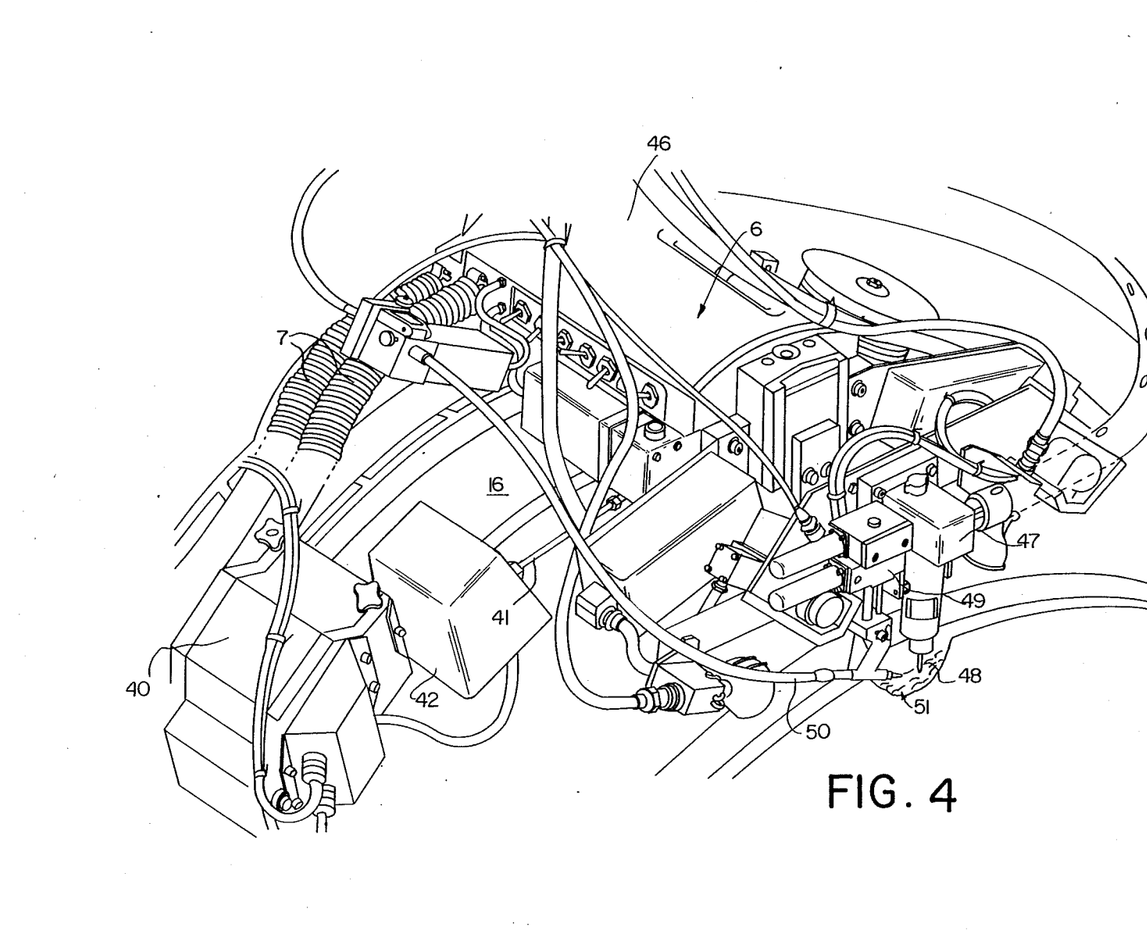
FIG. 4 is a perspective view of the welding head and the master carriage of the handling apparatus.

As can be seen in FIG. 4, the welding machine 6 comprises a carriage 46, to which the actual welding head 47 carrying the electrode 48 is fastened. The carriage 46 moves on the rail 16 and forms part of the annular articulated assembly of the catenary type ensuring the movement of the umbilicals 7 in the way described below.

The welding machine likewise includes means 49 for displaying the welding zone, a means 50 for bringing the filler wire into the vicinity of the electrode in the welding bevel 51, and means for ensuring that the welding zone is scavenged by inert gas.

As mentioned above, the motorized carriage 40 is connected to the carriage 46 of the welding head by means of a connecting rod 41 articulated, at one of its ends, on the carriage 46 and, at its other end, on the movable part of an angle sensor arranged in a control assembly 42 of the carriage 40. When the welding head moves about the bevel 51 by means of the carriage 46, the connecting rod 41 transmits a pull or a push to the angle sensor, depending on the direction of movement of the welding head. This pull or push, which depends on the instantaneous acceleration of the welding head, determines the feeding of the motor of the carriage 40, this feeding being regulated by means of an electronic control assembly 10a (FIG. 1) as a function of the information from the angle sensor 42. This results in a regulation of the speed of the carriage 40, the movements of which are completely subject to the movements of the carriage 46 of the welding head. It should be noted that the connection between the carriage 46 and the carriage 40 is a functional connection via a sensor and not a mechanical connection, as result of which the drive of the carriage 40 in no way interferes with the movement of the welding head. The carriage 40, in turn, drives all the carriages 43 connected by means of the spacer bars 44, the trough 35 and the umbilicals 7 fastened to the troughs 35 at the bracket 36. This driving of the movable assembly in rotation about the welding zone determines the winding or unwinding of the umbilicals, without this winding or unwinding interfering with the movement of the welding head. During winding, the umbilicals come to rest in the recessed part of the trough 35 forming a supporting cradle.

It should be noted that the trough 35, because of its structure, has a certain elasticity and a certain flexibility allowing it to adjust during the movement of the carriages on the rail 16 of the welding head.

During the winding or unwinding of the umbilicals 7 round the welding zone inside the trough 35, a length equivalent to the wound or unwound length of the umbilicals 7 must be extracted from or, on the contrary, returned to the storage tank 11. This function is performed by the motorized-pulley assembly 12, of which the rotation in one direction or the other at the desired speed is controlled by the control device 19 which receives a control signal coming from the angle sensor mounted on the support 23.

The connection ends 17 of the cables contained in the umbilicals 7 make it possible not only to feed and control the welding head, but also to feed and adjust the storage and handling apparatus which has just been described.

For this purpose, cables forming part of the assembly 17 are connected, inside the control station, to electronic boxes receiving the information from the angle sensors and, in response, supplying the motor control current to electrical connection devices.

To this end, the control station comprises a power box, a remote-controlled control box, an electrical interconnection, a connection for the motorized pulleys 12, a connection for the motorized carriage 40, and finally a safety connection for the welding, the functioning of which will be described below.

In the event of faults in the path of movement of the umbilicals 7, a procedure for quenching the arc is initiated automatically by means of the welding safety connection. It is possible to restart the equipment only when the fault has been repaired.

A set of indicator lamps makes it possible to locate the faulty sector quickly.

The remote-controlled control box has two channels, one intended for controlling the motorized carriage 40 and the other intended for the assembly of drive pulleys 12 for the umbilicals 7.

At the end of an orbital welding pass, when the welding head 6 has executed a complete revolution about the bevel 51, the orbital movement of the carriage 46 is stopped and the carriage is started up in the opposite direction. If appropriate, welding can be carried out in both directions of movement of the welding head. In one of the directions of movement, the umbilicals 7 wind round the components to be welded and are received within the trough 35, and in the other direction of movement the umbilicals 7 are unwound and leave the trough 35 progressively. In the first case, the umbilicals 7 are extracted from the storage container 11, and in the other case the umbilicals 7 are returned to it.

The apparatus according to the invention thus allows a connection to be made between an orbitally moving welding head and a control station distant from the welding zone by means of at least one flexible element, for example an umbilical containing cables, without this connection interfering with the movement of the welding head.

The trough for receiving the cables or umbilicals may have a shape or structure different from that described. It is possible to use a larger or smaller number of carriages connected to one another in an articulated manner and to a motorized carriage moving on the rail the welding machine. It is likewise possible to conceive other methods of connection between the carriages and, if appropriate, to use carriages which are connected only by means of the trough for receiving the flexible element.

Finally, the apparatus according to the invention can be used in sectors other than from the nuclear sector and in the remote-controlled orbital welding of any rotationally symmetrical component of large size.

I claim:

1. Apparatus for the storage and handling of at least one elongate flexible element (7), such as a feeder and signal transmission cable for a machine for the orbital welding of large, rotationally symmetrical components, remotely controlled from a control station (5) and comprising a motorized welding head (6) which is mounted movably on a running rail (16) arranged around the components to be welded (2) and to which one end (17) of said elongate flexible element (7) is connected, said apparatus comprising
   (a) a storage container (11) for said flexible element (7), said storage container being connected to said control station (5) by at least one junction cable (17) and comprising at least one compartment (11a, 11b) for a reserve length of said flexible element.

2. Storage and handling apparatus according to claim 1, wherein said annular assembly is in catenary form, said carriages (43) being connected to one another and to said master carriage (40) by articulated spacer bars (44).

3. Storage and handling apparatus according to claim 2, wherein said master carriage (40) located near said welding head (6) is controlled by means of a movement control assembly (42) having a detector connected to said welding head (6) by a connecting rod (21).

4. Storage and handling apparatus according to claim 3, wherein said detector is an angle detector.

5. Storage and handling apparatus according to claim 1, wherein said trough (35) consists of a structure of tubes comprising two hoops (35a, 35b) connected by curved struts (37) and forming a cradle, said trough (35) being connected to each of said carriages (40, 43) of said annular assembly.

6. Storage and handling apparatus according to claim 1, comprising an assembly of motorized pulleys (12) arranged at said outlet of said storage container (11) and having speeds controlled by means of a control assembly (19, 20) comprising pulleys (21) which are mounted loosely on a slide (22) mounted slidably on a support (23) mounted on said storage container (11), a counterweight (24) and an angle sensor fixed to said support (23) keeping said loosely mounted pulleys (21) in contact with said moving flexible element (7).

7. Storage and handling apparatus according to claim 1, comprising guide means (13, 14) consisting of pulleys mounted loosely on an axle adjustable in terms of position and inclination.

* * * * *

UNITED STATES PATENT AND TRADEMARK OFFICE
CERTIFICATE OF CORRECTION

PATENT NO. : 4,939,337

DATED : July 3, 1990

INVENTOR(S) : Gente

It is certified that error appears in the above-identified patent and that said Letters Patent is hereby corrected as shown below:

Claim 1 should read as follows:

--1. Apparatus for the storage and handling of at least one elongate flexible element (7), such as a feeder and signal transmission cable for a machine for the orbital welding of large, rotationally symmetrical components, remotely controlled from a control station (5) and comprising a motorized welding head (6) which is mounted movably on a running rail (16) arranged around the components to be welded (2) and to which one end (17) of said elongate flexible element (7) is connected, said apparatus comprising     (a) a storage container (11) for said flexible element (7), said storage container being connected to said control station (5) by at least one junction cable (17) and comprising at least one compartment (11a, 11b) for a reserve length of said flexible element

UNITED STATES PATENT AND TRADEMARK OFFICE
CERTIFICATE OF CORRECTION

PATENT NO. : 4,939,337

DATED : July 3, 1990

INVENTOR(S) : Gente

Page 2 of 3

It is certified that error appears in the above-identified patent and that said Letters Patent is hereby corrected as shown below:

(7), of which a stationary end opposite the end connected to said welding head (6) is fixed to said junction cable (17);

(b) means (12, 13, 14) for guiding and handling said flexible element (7), said means being arranged between an outlet of said storage container (11) and said welding head (6) and consisting of pulleys (12a, 12b; 13a, 13b; 14a, 14b), at least one of said pulleys located at said outlet of said storage container (11) being motorized and having a regulated speed;

(c) an assembly mounted for movement in either direction about said components to be welded and comprising     (i) a motorized master carriage (40) movably mounted on said running rail (16) of said welding head (6) and subject to movements of said welding head;

UNITED STATES PATENT AND TRADEMARK OFFICE
CERTIFICATE OF CORRECTION

PATENT NO. : 4,030,337

DATED : July 3, 1990

INVENTOR(S) : Gente

It is certified that error appears in the above-identified patent and that said Letters Patent is hereby corrected as shown below:

(ii) a plurality of carriages (43) connected to said master carriage (40) and forming, with said welding had (6) and said master carriage (40), an annular assembly movable on said running rail (16) of said welding head (6); and (iii) an annular trough (35) for receiving said flexible element (7) and which is fastened to said annular assembly (6, 40, 43).

Signed and Sealed this

Twenty-ninth Day of June, 1993

Attest:

MICHAEL K. KIRK

Attesting Officer

Acting Commissioner of Patents and Trademarks